July 18, 1961     O. L. UTT     2,993,116
ELECTRONIC TRACK CIRCUIT
Filed Dec. 3, 1958     2 Sheets—Sheet 1

INVENTOR.
Orval L. Utt.
BY W. L. Stout
HIS ATTORNEY

July 18, 1961 — O. L. UTT — 2,993,116
ELECTRONIC TRACK CIRCUIT
Filed Dec. 3, 1958 — 2 Sheets-Sheet 2
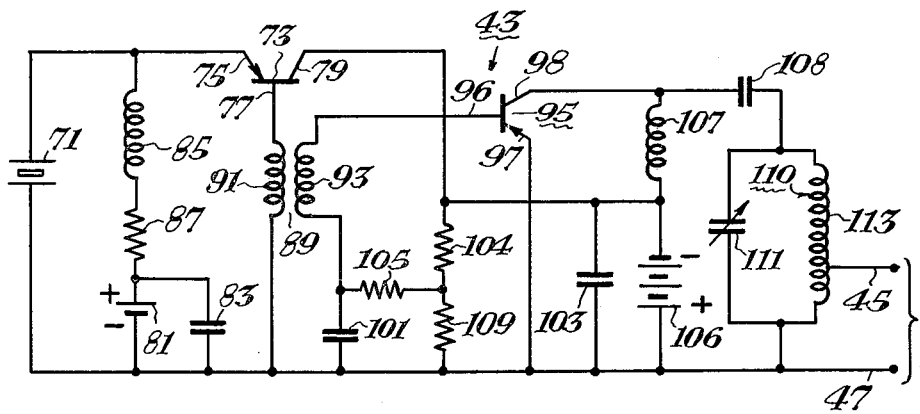
Fig. 3.
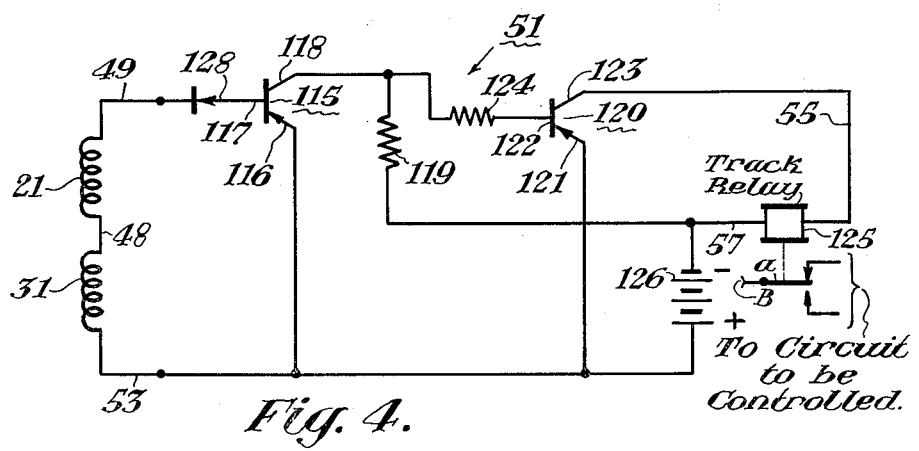
Fig. 4.
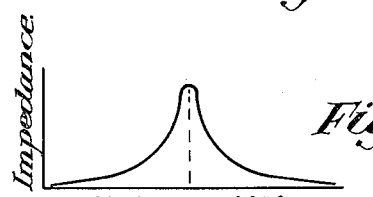
Fig. 2b.
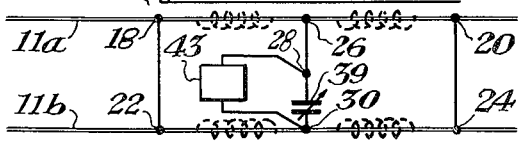
INVENTOR.
Orval L. Utt.
BY W. L. Stout.
HIS ATTORNEY United States Patent Office 2,993,116
Patented July 18, 1961

2,993,116
ELECTRONIC TRACK CIRCUIT
Orval L. Utt, Monroeville, Pa., assignor to Westinghouse Air Brake Company, Wilmerding, Pa., a corporation of Pennsylvania
Filed Dec. 3, 1958, Ser. No. 777,981
9 Claims. (Cl. 246—34)

My invention relates to track circuits, and more particularly to an electronic track circuit for detecting the presence of railway vehicle wheels within a relatively short and well defined length of track.

For various applications such as the counting of wheels, there is a marked need in the railway art for track circuits which can be made extremely short without using insulated joints, that is, for use with continuous sections of track rails. Such short track circuits are particularly useful for applications such as counting the wheels passing a given point. Heretofore various schemes for providing track circuits having short and well defined limits have been disclosed as in, for example, the patent application of Philip H. Luft Serial No. 718,557, filed on March 3, 1958, for Control Circuits and which is assigned to the same assignee as the present application. However for purposes of detecting the individual wheels of a truck on a railway vehicle these prior art track circuits are still not sufficiently short and do not have the necessary sharply defined limits. As is known, the distance between the pairs of wheels of railway vehicle trucks may be in the order of 5 feet and the space between the trailing wheels of the front truck and the leading wheels of the rear truck may be in the order of 40 feet so that any wheel counting track circuit must be relatively very short. Obviously these prior art circuits are not suitable for operation as wheel counting circuits.

Accordingly, it is a principal object of my invention to provide a track circuit of sufficiently short limits to be responsive to the presence of the individual wheels of a railway vehicle.

It is another object of my invention to provide a track circuit adaptable for counting the wheels in railway vehicles.

In the attainment of the foregoing objects I provide a track circuit including first and second series resonant circuits connected across the track rails to spaced points for defining the limits of the track circuit. A third series resonant circuit is connected to said track rails at a point intermediate the first and second series resonant circuits. A capacitor forming a parallel resonant circuit with the impedance of the track rails between the first and second resonant circuits is connected in series with said third resonant circuit and a source of signals is connected across said capacitor. The output of the circuit is coupled from each of the inductances of said first and second resonant circuits to a receiver which in turn controls the operation of a track relay.

Other objects and advantages of my invention will become apparent from the following description and the accompanying drawings in which:

FIG. 1 shows a schematic diagram of an embodiment of the track circuit according to my invention;

FIG. 2a shows an equivalent circuit of the schematic diagram of FIG. 1;

FIG. 2b shows a graph of relative impedance values within the limits of the track circuit;

FIG. 3 shows a schematic diagram of a transmitter circuit that may be used in the circuit of FIG. 1, and FIG. 4 is a schematic diagram of a receiver circuit that may be used in the circuit of FIG. 1.

It will be understood at the outset that a control circuit according to my invention may be employed in any application where it is desired to actuate a device such as a relay when a wheel of a track vehicle is within a few feet of a designated point, and although my circuit may be conveniently arranged for use as a car counting device it is not limited to use with such devices.

Referring to FIG. 1, my track circuit is shown as connected to a section of track rails 11a and 11b. A transmitter 43 provides an alternating current signal at a given operating frequency and the circuit elements are adjusted and arranged to be responsive to the operating frequency. It will be understood that for purposes of this description the resonance operating conditions are related to the operating frequency of transmitter 43.

A first series resonant circuit 13 is connected across rails 11a and 11b to points 18 and 22 respectively, and comprises a capacitor 15 in series with an inductance 17 which is the primary winding of a transformer 19. Series resonant circuit 13 determines the left-hand extreme limit, as oriented in FIG. 1, of my track circuit. A second series resonant circuit 23 is connected across rails 11a and 11b to points 20 and 24 respectively and comprises a capacitor 25 in series with an inductance 27 which is the primary winding of a transformer 29. Resonant circuit 23 is connected to rails 11a and 11b approximately 5 to 6 feet distance from the connection of resonant circuit 13 to rails 11a and 11b and determines the right-hand extreme limit of my track circuit. It should be understood that capacitors 15 and 25 are in series resonance with the inductance of windings 17 and 27 respectively plus the inductance of the various leads connecting the components to each other and to the track rails.

A third series resonant circuit 33 is formed by connecting a tuning capacitor 35 in an electrical lead 37 which lead is connected to rail 11a at point 26 intermediate points 18 and 20. The inductance of lead 37 is indicated by dotted lines in FIG. 1. Resonant circuit 33 is connected in series with a capacitor 39 which capacitor is connected to track rail 11b at point 30 intermediate the points 22 and 24. It will be understood that capacitor 39 is connected as close to rail 11b as practical so as to reduce the inductive impedance of the connecting lead. It would also be possible to connect the capacitor 39 approximately an equal distance between the rails 11a and 11b and then connect a trimmer capacitor on either side of capacitor 39 to tune out the inductance of the leads which would connect capacitor 39 to the rails. However, to facilitate tuning, capacitor 39 is connected, as noted above, as close to one rail as practical so that only one trimmer capacitor is required.

A source of alternating current indicated as a transmitter 43 has its output terminals 45 and 47 connected across capacitor 39. Any suitable source of signals may be employed in conjunction with my track circuit. For purposes of this description I show one embodiment of the transmitter 43 in FIG. 3 which transmitter will be described in more detail hereinbelow.

One terminal, the lower one as oriented in FIG. 1, of secondary winding 21 of transformer 19 is connected by lead 48 to one, the lower terminal of secondary winding 31 of transformer 29. The other, or upper, terminal of secondary 21 is connected by lead 49 as one input to a receiver 51, and the other or upper terminal of secondary 31 is connected by lead 53 as the other input to receiver 51. Windings 21 and 31 are connected to be in series aiding or adding relation. The output of receiver 51 is connected by leads 55 and 57 to the operating coil of a track relay 125 to control the operation thereof. The circuit to be controlled is connected through a front contact a of track relay 125 to a source of potential indicated as B. As noted before, the circuit to be controlled may be a car counting device, or a track indicator of any desired type. Any suitable type of receiver may be employed in conjunction with my track circuit. For purposes of this description I show one embodiment of receiver 51 in FIG. 4 which receiver will be described in more detail hereinbelow.

Referring to FIG. 3, the circuit of transmitter 43 will now be briefly described. A crystal controlled oscillator is employed as the signal generator because of its inherent frequency stability and because it is less sensitive to any variations in the input supply voltage. The operation of crystal controlled oscillators is well known in the art and the details thereof will not be repeated here. In the embodiment of my invention as shown in FIG. 1, a crystal 71 which oscillates at 3.5 megacycles is utilized. One terminal of crystal 71 is connected to the emitter 75 of a transistor amplifier 73 and the other terminal of crystal 71 is connected to a lead 47 which may be considered as the reference lead. Transistor 73 is of the P-N-P type and includes base 77 and collector 79. Internal feedback within transistor 73 from collector 79 to emitter 75 sustains oscillations in crystal 71. The operating potential for forward biasing emitter 75 is obtained from a battery 81 which has its positive terminal connected through a voltage dropping resistor 87 and choke coil 85 to the emitter 75 of transistor 73. The negative terminal of battery 81 is connected to reference lead 47. A signal by-pass capacitor 83 is connected across battery 81. The operating potential for negatively biasing collector 79 is obtained from a battery 106 which has its negative terminal directly connected to collector 79 and its positive terminal connected to reference lead 47. Base 77 of transistor 73 is connected through primary winding 91 of a transformer 89 to reference lead 47.

Transformer 89 couples the output signal through its secondary winding 93 to the base 96 of a second P-N-P type transistor amplifier 95. It has been found that coupling the output signal from the base 77 circuit provides a good impedance match to the following transistor 95 stage. Base 96 of transistor 95 is connected through secondary winding 93, and resistors 105 and 104 to the negative terminal of battery 106. The emitter 97 of transistor 95 connects to reference lead 47 and collector 98 of transistor 95 connects through choke coil 107 to the negative terminal of battery 106. Capacitor 101, a signal by-pass capacitor, connects secondary winding 93 to reference lead 47 such that the signal voltage is impressed across the base to emitter circuit of transistor 95. Resistor 109 having one terminal connected to the junction of resistors 104 and 105 and its other terminal connected to reference lead 47 effects with resistor 104 a voltage dividing network for battery 106 to provide the proper biasing voltage to base 96. Capacitor 103 is the usual signal by-pass capacitor for battery 106.

Collector 98 of transistor 95 couples the output signal through a capacitor 108 to a tank circuit 110 consisting of a capacitor 111 connected in parallel to an inductance 113. The output signal is taken from a tap on inductance 113 through leads 45 and 47.

A transistorized receiver of a type suitable for use in the circuit of FIG. 1 is shown in FIG. 4. An input signal to receiver 51 is coupled from the series connected secondary windings 21 and 31 through a half-wave rectifier 128 to the base 117 of a first P-N-P type transistor amplifier 115. The emitter 116 of transistor 115 is connected to the positive terminal of an operating source shown as a battery 126 and the collector 118 of transistor 115 is connected through a voltage dropping resistor 119 to the negative terminal of said battery. Collector 118 is also connected through a current limiting resistor 124 to the base 122 of a second P-N-P type transistor amplifier 120. The emitter 121 of transistor 120 is connected to the positive terminal of battery 126 and the collector 123 of transistor 120 is connected by lead 55 through the operating winding of a track relay 125 to the negative terminal of battery 126.

As noted above, in normal operation transmitter 43 provides a 3.5 mc. signal to rails 11a and 11b. This operating signal is coupled through transformers 19 and 29 to receiver 51. As is known receiver 51 receives and amplifies the signal energy from transmitter 43. Due to rectifier 128, receiver 51 operates as a direct current amplifier. Relay 125 is sufficiently slow acting such that the rectified and amplified signal output from receiver 51 maintains said relay in a normally energized condition with its contact a picked up.

The operation of my track circuit is substantially as follows. As noted above, and as shown in FIG. 1 the limits of the track circuit is determined by the distance between points 18 and 20 on rail 11a and/or the distance between points 22 and 24 on rail 11b. This distance is desirably about 5 to 6 feet to provide a circuit which will respond to each pair of wheels and the associated axle of a railway vehicle. When the track section within the limits of my track circuit is unoccupied signal energy from transmitter 43 will be coupled through rails 11a and 11b and transformers 19 and 29 to receiver 51 to maintain the track relay 125 picked up.

As noted above, capacitor 15 is adjusted to series resonance with inductance or winding 17 so that the resulting impedance of the series circuit 13 is the effective resistance of capacitor 15 and inductance 17 which is made extremely low by the appropriate selection of components. Likewise capacitor 25 and inductance or winding 27 are adjusted to series resonance. Capacitor 35 is also adjusted to be in series resonance with lead 37 to minimize the total impedance thereacross. As is known, in a series resonant circuit the magnitude of the inductive and capacitive reactances balance each other so that the total reactance is reduced to zero. Capacitor 39 is selected to be in parallel resonance with the inductance of track rail 11a between the points 18 and 20 and with the inductance of rail 11b between the points 22 and 24. As is known the impedance across the terminal of a parallel circuit is large at resonance. Under the above conditions it will be appreciated, that as concerns the operation of my track circuit at the operating frequency, points 18 and 22 are connected together to an extremely low resistance and are, in effect, one and the same point. Likewise, as concerns the operation of the track circuit, points 20 and 24, and points 26 and 28 are in effect, one and the same point. The resulting equivalent circuit of what transmitter 43 couples into is indicated in FIG. 2a. In FIG. 2a, Zg indicates the usual internal impedance of the transmitter.

As will be readily appreciated the operation of my track circuit is bi-directional, therefore, a discussion of the movement of a train in one direction is deemed sufficient to the understanding of the operation of my track circuit. Assuming, a pair of wheels and the associated axle, that is, a wheel and axle unit is moving along the track rails 11a and 11b in the direction indicated by the arrow in FIG. 1. Referring now to FIG. 2b, which indicates the relative impedance along the length of track rails 11a and 11b between points 18, 22 and 20, 24 respectively the wheels and axle do not measurably affect the track circuit as long as the vehicle is to the left of points 18 and 22. Even when the wheels and axle are across points 18 and 22, there is no significant effect upon the track circuit since, due to the extremely low impedance of the series resonant circuit 13, the voltage between points 18 and 22 is substantially zero and the shunt formed by the wheels and axle unit does not measurably decrease the impedance existing thereacross. However, as the first pair of wheels and axle moves toward points 26 and 30, the effect of the wheels and axle become increasingly greater until at points 26 and 30 said wheels and axle forms a shunt across the high impedance parallel resonant circuit formed by capacitor 39 and the inductance of that portion of the rails between the series resonant circuits 13 and 23. This, of course, interrupts signal energy flow from transmitter 43 to transformers 19 and 29 and causes receiver 51 to be deenergized to release track relay 125. Another way of expressing the operation of my circuit is that as the wheels and axle move from points 18 and 22 toward points 26 and 30 the parallel resonant circuit is progressively detuned to decrease the load impedance it presents to transmitter 43 which, as is known, decreases the signal energy coupled to receiver 51.

As the wheels and axle continue to move to the right past points 26 and 30 they have an increasingly smaller effect until points 20 and 24 are reached, at which time the impedance of the wheels and axle again have no effect upon the track circuit and signal energy from transmitter 43 is again coupled through transformers 19 and 29 to energize receiver 51 and pick up track relay 125. The actual points within my track circuit limits at which the wheels and axle shunt sufficient transmitter signal energy away from transformers 19 and 29 to deenergize receiver 51 is determined by such factors as, the amplitude of the signal current, ballast conditions, and receiver sensitivity.

Since the distance between points 18—22 and points 20—24 is equal to or less than the distance between the axles of a railway truck, as the car progresses to the right the second pair of wheels and axle on the truck move into the section of track formed by point move within the limits of my track circuit as defined by points 18—20 and 20—24. Thus the receiver 51 is deenergized each time a wheel and axle unit moves through my track circuit and causes relay 125 to release to open its front contact *a* and interrupt the circuit extending from the terminal indicated as B to the circuit to be controlled.

While my invention has been described with reference to a particular embodiment thereof, it will be understood that various modifications may be made by those skilled in the art without departing from the invention. The appended claims are therefore intended to cover all such modifications within the true spirit and scope of the invention.

Having thus described my invention, what I claim is:

1. A section of railway track, a track circuit for said section comprising means connecting signal energy at a given operating frequency across the rails of said track section, reactance means connected across said rails, first shunt means connected across said rails at points along the length of each of the rails spaced from the connection of said reactance means to said rails, said reactance means forming a parallel resonant circuit at said operating frequency with the impedance of that portion of said track rails between the connections of said impedance means and said first shunt means to said rails whereby a large load impedance is presented by said track circuit to said signal energy until a second shunt is effected across said track rails between the connections of said reactance means and said first shunt means to said rails, and utilization means electrically coupled to said first shunt means whereby said second shunt is registered.

2. A section of railway track, a track circuit for said section comprising a first and a second network connected across the rails of said track section and at points along the length of each of the rails spaced from one another, reactance means connected across said rails at points intermediate the connections of said first and second networks to said rails, and means connecting signal energy at a given operating frequency to said track rails at points intermediate the connections of said first and second networks to said rails, said first and second networks being in series resonance at said operating frequency, and said reactance means forming a parallel resonant circuit at said operating frequency with the reactance of that portion of said track rails between the connections of said first and second networks to said track rails whereby a large load impedance is presented by said track circuit to said signal energy until a shunt is effected across said track rails between said first and second networks, and utilization means electrically coupled to said networks for detecting said shunt.

3. A section of railway track, a track circuit for said section comprising a first and a second network each including a capacitor connected in series with an inductance, said networks being connected across the rails of said track section and to points spaced along the length of each of the rails from one another, a third capacitor, means connecting said third capacitor across said rails at a point intermediate the connections of said first and second networks to said rails, means connecting signal energy at a given operating frequency across said rails at a point intermediate the connections of said first and second networks to said rails, said third capacitor forming a parallel resonant circuit at said operating frequency with the inductance of that portion of said track rails between the connections of said first and second networks, and said first and second networks forming a series resonant circuit at said operating frequency whereby a large load impedance is presented by said track circuit to said signal energy until a shunt is effected across said track rails between the connections of said first and second networks to said rails, and utilization means electrically coupled to said networks for detecting said shunt.

4. A section of railway track, a track circuit for said section comprising means coupling signal energy at a given operating frequency to the rails of said track section, means receiving said signal energy, a first series resonant circuit connected across said rails, a second series resonant circuit connected across said rails to points spaced along the length of each of the rails with relation to the connections of said first series resonant circuit to said rails, said series resonant circuits providing a shunt across said track rails at the signal energy for determining the limits of said track circuit, means connecting a capacitor across said rails at points intermediate the connections of said first and second series resonant circuits to said rails, said capacitor forming a parallel resonant circuit with the inductance of that portion of said rails between said series resonant circuits, said means coupling signal energy to said track rails being connected across said capacitor and effectively into the high impedance of said parallel resonant circuit, and means coupling signal energy from said series resonant circuits to said receiving means until the presence of a shunt such as by a train wheel and axle unit within that portion of said rails between said series resonant circuits interrupts the signal energy being coupled to said receiving means.

5. A section of railway track, a track circuit for said section comprising means coupling signal energy at a given operating frequency to the rails of said track section, means receiving said signal energy, a pair of series resonant circuits connected across said rails to points spaced along the length of each of the rails to effect a shunt across said rails at the operating frequency of the signal energy to define the limits of said track circuit, a capacitor forming a parallel resonant circuit with the inductance in that portion of said rails between the connections of said pair of resonant circuits to said rails being connected across said track rails to points intermediate said connections of said pair of series resonant circuits to said rails, said means coupling signal energy to said track rails being connected across said capacitor to feed into the high impedance of said parrallel resonant circuit, means coupling signal energy from said series resonant circuits to said receiving means whereby signal energy is coupled to said receiving means until a shunt is formed across said rails within that portion of said rails between the connections of said series resonant circuits to said rails.

6. A section of railway track, a track circuit for said section comprising means coupling signal energy at a given frequency to the rails of said track section, first and second transformers each having primary and secondary windings, a capacitor connected in series with the primary winding of each of said transformers for forming a series resonant circuit therewith, said series resonant circuits being connected across said rails to points spaced along the length of each of the rails, said secondary windings of said transformers being connected in series with one another, a network including a third series resonant circuit connected in series to a third capacitor connected across said track rails at a point intermediate the connections of said first and second series resonant circuits to said track rails, said capacitor forming a parallel resonant circuit with the inductance of that portion of said track rails between the connections of said first and second resonant circuits to said track rails, and a receiver, said transformers normally coupling signal energy to said receiver until a shunt such as is caused by the presence of a railway vehicle wheel and axle unit within that portion of the rails intermediate the connections of said first and second series resonant circuits to said rails detunes said parallel resonant circuit.

7. A section of railway track, a track circuit for said section comprising in combination means coupling signal energy at a given frequency to the rails of said track section, first and second transformers each having primary and secondary windings, a first series resonant circuit including a capacitor and the primary winding of said first transformer, said series resonant circuit connected across said track rails, a second series resonant circuit including a capacitor and the primary winding of said second transformer, said second series resonant circuit being connected across said track rails to points spaced along the length of each of the rails with relation to the connections of said first series resonant circuit to said rails, the secondary windings of said first and second transformers being connected in series relation, resistive means connecting a third capacitor across said track rails at a point intermediate the connections of said first and second series resonant circuits to said rails, said signal coupling means being connected across said third capacitor, said third capacitor forming a parallel resonant circuit with that portion of the track rails between the connections of said first and second series resonant circuits to said rails to present a large impedance to said signal energy, a receiver, the secondary windings of said transformers being connected to said receiver for coupling signal energy at said operating frequency thereto whereby said receiver is energized until a shunt such as due to the presence of a railway vehicle exists within the portion of said track rails between the connections of said first and second series resonant circuits to said rails.

8. A section of railway track, a track circuit for each section comprising in combination means coupling signal energy at a given frequency to the rails of said track section, first and second transformers each having primary and secondary windings, a first series resonant circuit including a capacitor and the primary winding of said first transformer, said series resonant circuit connected across said track rails, a second series resonant circuit including a capacitor and the primary winding of said second transformer, said second series resonant circuit being connected across said track rails to points spaced along the length of each of the rails with relation to the connections of said first series resonant circuit to said rails, the secondary windings of said first and second transformers being connected in series aiding relation, an electrical lead connected to one of said rails at a point intermediate the connections of said resonant circuits to said rails, a third and a fourth capacitor connected in series with said lead, said fourth capacitor being connected to the other of said rails at a point intermediate the connections of said first and second series resonant circuits to said rails, said signal coupling means being connected across said fourth capacitor, said fourth capacitor forming a parallel resonant circuit with that portion of the track rails between the connections of said first and second series resonant circuits to said rails to present a large impedance to said signal energy, a receiver, the secondary windings of said transformers being connected to said receiver for coupling signal energy at said operating frequency thereto whereby said receiver is energized until a shunt such as due to the presence of a railway vehicle exists within the portion of said track rails between the connections of said first and second series resonant circuits to said rails.

9. A section of railway track, a track circuit for each section comprising, means coupling signal energy at a given frequency to the rails of said track section, a pair of series tuned resonant circuits connected across said rails to points spaced along the length of each of the rails, an electrical lead connected to one of said rails at a point intermediate the connections of said resonant circuits to said rails, a first and a second capacitor connected in series with said lead, said second capacitor being connected to the other of said rails at a point intermediate the connections of said pair of series resonant circuits to said rails, said first capacitor being resonant with the inductance in said lead, said signal energy coupling means being connected across said second capacitor, said second capacitor being in parallel resonance with the inductance present in that portion of said rails between the points where said pair of series resonant circuits are connected to said rails whereby a large load impedance is presented by said track circuit to said signal energy until a shunt is applied across that portion of said track rails between the connections of said series resonant circuits to said rails, and utilization means electrically coupled to said series resonant circuits for detecting said shunt.

No references cited.